US010686966B1

(12) United States Patent
Becerra

(10) Patent No.: US 10,686,966 B1
(45) Date of Patent: Jun. 16, 2020

(54) SYSTEMS AND METHODS FOR SECURE PRINTING

(71) Applicant: KYOCERA Document Solutions Inc., Osaka-shi, Osaka (JP)

(72) Inventor: Arturo Becerra, Los Angeles, CA (US)

(73) Assignee: KYOCERA Document Solutions, Inc., Osaka (JP)

( * ) Notice: Subject to any disclaimer, the term of this patent is extended or adjusted under 35 U.S.C. 154(b) by 0 days.

(21) Appl. No.: 16/440,128

(22) Filed: Jun. 13, 2019

(51) Int. Cl.
| G06F 3/12 | (2006.01) |
| H04N 1/44 | (2006.01) |
| H04N 1/00 | (2006.01) |
| G06F 21/62 | (2013.01) |
| G06F 21/31 | (2013.01) |
| G06F 3/0482 | (2013.01) |

(52) U.S. Cl.
CPC ........... *H04N 1/444* (2013.01); *G06F 3/1222* (2013.01); *G06F 3/1238* (2013.01); *G06F 21/316* (2013.01); *G06F 21/6245* (2013.01); *H04N 1/00411* (2013.01); *H04N 1/00514* (2013.01); *H04N 1/4453* (2013.01); *G06F 3/0482* (2013.01)

(58) Field of Classification Search
None
See application file for complete search history.

(56) References Cited

U.S. PATENT DOCUMENTS

| 8,046,721 | B2 | 10/2011 | Chaudhri et al. | |
| 2006/0174339 | A1* | 8/2006 | Tao | G06F 21/36 726/18 |
| 2007/0150842 | A1* | 6/2007 | Chaudhri | G06F 3/0488 715/863 |
| 2009/0147292 | A1* | 6/2009 | Shimura | H04N 1/00854 358/1.14 |
| 2009/0207434 | A1* | 8/2009 | Tanaka | H04N 1/00854 358/1.14 |
| 2011/0051182 | A1* | 3/2011 | Sugiyama | H04N 1/00326 358/1.15 |

(Continued)

*Primary Examiner* — Henok Shiferaw
(74) *Attorney, Agent, or Firm* — Sheppard, Mullin, Richter & Hampton LLP

(57) ABSTRACT

Displaying an authentication interface on an operation panel associated with a printing device, the operation panel including a plurality of authentication areas. Receiving a user authentication request. Detecting a particular authentication pattern associated with the user authentication request. Retrieving a registered authentication pattern associated with the user. Comparing the particular authentication pattern with the registered authentication pattern. Determining, based on the comparing, whether the user authentication request is authorized. If the user authentication request is authorized, retrieving a first electronic document associated with the user, and printing the first electronic document. If the user authentication request is not authorized, determining whether the first electronic document includes a confidential object, obtaining, in response to determining the first electronic document includes a confidential object, an alternative object associated with the confidential object, and generating a second electronic document by replacing the confidential object with the alternative object on the first electronic document.

20 Claims, 7 Drawing Sheets

(56) References Cited

U.S. PATENT DOCUMENTS

| | | | |
|---|---|---|---|
| 2012/0252410 A1* | 10/2012 | Williams | G06F 21/36 |
| | | | 455/411 |
| 2012/0268248 A1 | 10/2012 | Hiraide | |
| 2014/0020088 A1* | 1/2014 | Bell | G06F 21/36 |
| | | | 726/19 |
| 2018/0260555 A1* | 9/2018 | Hardee | G06F 21/36 |
| 2019/0056897 A1* | 2/2019 | Balinsky | G06F 3/1238 |
| 2019/0281044 A1* | 9/2019 | Doi | H04L 9/0863 |

* cited by examiner

SYSTEMS AND METHODS FOR SECURE PRINTING

TECHNICAL FIELD

This disclosure pertains to systems for printing (e.g., sheets of paper) and/or for performing other imaging functions (e.g., copying, faxing, scanning, multi-function device functions). More specifically, this disclosure pertains to systems for secure printing and/or for performing other secure imaging functions.

BACKGROUND

Copy machines, printers, fax machines, scanners, multi-function devices, and other image forming apparatuses are common devices in business and homes. Typically, users may easily access such devices to print documents, fax documents, scan documents, and/or the like.

SUMMARY

Various embodiments of the present disclosure include systems, methods, and non-transitory computer readable media configured to display an authentication interface on an operation panel associated with a printing device, the operation panel including a plurality of authentication areas, the authentication interface being capable of prompting a user to input an authentication pattern. Receiving a user authentication request using the authentication interface, the user authentication request being associated with the user. Detecting a particular authentication pattern associated with the user authentication request, the detecting the particular authentication pattern including detecting a group of taps on the operation panel, the detecting the group of taps on the operation panel including detecting a first user pressure on a first authentication area of the plurality of authentication areas and a second user pressure on a second authentication area of the plurality of authentication areas. Retrieving a registered authentication pattern associated with the user, the registered authentication pattern including one or more registered user pressures in one or more authentication areas of the plurality of authentication areas. Comparing the particular authentication pattern with the registered authentication pattern, the comparing including comparing the first user pressure and the second user pressure against the one or more registered user pressures. Determining, based on the comparing, whether the user authentication request is authorized. If the user authentication request is authorized, retrieving a first electronic document associated with the user, and printing the first electronic document. If the user authentication request is not authorized, determining whether the first electronic document includes a confidential object, obtaining, in response to determining the first electronic document includes a confidential object, an alternative object associated with the confidential object, and generating a second electronic document by replacing the confidential object with the alternative object on the first electronic document. Printing the second electronic document.

These and other advantages will become apparent to those skilled in the relevant art upon a reading of the following descriptions and a study of the several examples of the drawings.

DETAILED DESCRIPTION

Copy machines, printers, fax machines, scanners, multi-function devices, and other image forming apparatuses are common devices in business and homes. Typically, users may easily access such devices to print documents, fax documents, scan documents, and/or the like. This may raise a variety of security issues, such as allowing unauthorized users to print confidential documents.

A claimed solution rooted in computer technology overcomes problems specifically arising in the realm of computer technology. In various embodiments, a printing system is configured to present an authentication interface. The authentication interface may be used by a user to log into, and/or otherwise access, the printer system. For example, the user may access the printing system to print documents, fax documents, scan documents, and/or the like. The authentication interface may include a pressure-sensitive graphical user interface (GUI). In some embodiments, the authentication interface may present a grid including multiple authentication areas, and a user may input an authentication pattern by touching different authentication areas in a particular sequence and with particular pressure(s). The printing system may compare the inputted authentication pattern against a registered authentication pattern associated with the user. If the inputted authentication pattern matches, or substantially matches, the registered authentication pattern associated with the user, then the printing system may allow the user to access the printing system (e.g., to print a document). If the inputted authentication pattern does not match, or substantially match, the registered authentication pattern associated with the user, then the printing system may prevent the user from accessing the printing system and/or may initiate other security actions. For example, the printing system may modify portions of a document (e.g., a document the user has requested to print), and then print the modified electronic document instead of the requested document.

Figure 1:
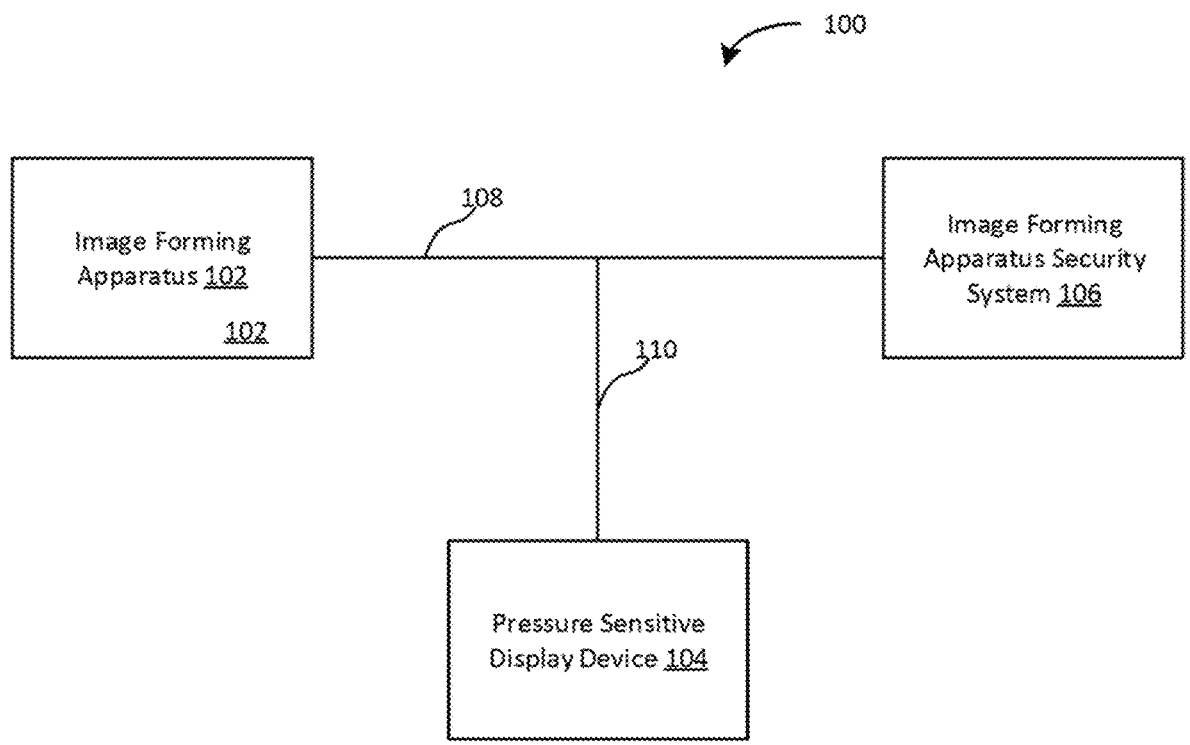
FIG. 1 depicts a diagram of an example system for secure printing according to some embodiments.

FIG. 1 depicts a diagram of an example system 100 for secure printing according to some embodiments. In the example of FIG. 1, the system 100 includes an image forming apparatus system 102, a pressure sensitive display device 104, an image forming apparatus security system 106, and communication links 108 and 110.

The image forming apparatus 102 may function to print, copy, fax, and/or provide other imaging functions. In various embodiments, functionality of the image forming apparatus 102 may be performed by one or more printers, copy machines, fax machines, multi-functions peripheral (MFP) devices, and/or the like. In various embodiments, the image forming apparatus 102 includes one or more network interfaces for communicating with one or more other systems via communication link(s). Like the other systems described herein, the image forming apparatus 102 may include some or all of the functionality of the other systems described herein. It will be appreciated that any of the functionality described herein with reference to printing may also be applied to other functions (e.g., copying, faxing, scanning).

The pressure sensitive display device (or, "operation panel") 104 may function to provide a pressure sensitive interface. In various embodiments, functionality of the pressure sensitive display device 104 may be integrated into one or more other systems or devices described herein, and/or may comprise a separate system or device. For example, the pressure sensitive display device 104 may comprise a portion of the image forming apparatus 102, or it may comprise a mobile device (e.g., tablet computer, smartphone, laptop computer) and/or other computing device in communication with the image forming apparatus 102.

In some embodiments, the pressure sensitive interface comprises a touch-sensitive and pressure-sensitive graphical user interface (GUI). The pressure sensitive interface may present (e.g., display) an authentication interface. The authentication interface may prompt a user to input an authentication pattern, and/or receive an authentication pattern as an input from a user. In some embodiments, an authentication pattern is a set of user touches on various predetermined areas of the authentication user interface. A user touch may be a tap, swipe, and/or gesture, and the predetermined areas may form a grid or other structure. The pressure sensitive display device 104 may detect a pressure and a location (e.g., a location in the grid) for each user touch of a set of user touches forming an authentication pattern. In some embodiments, the pressure sensitive display device 104 may be treated as a single zone or not be location sensitive. In such a case, the system may detect the pressure pattern, regardless of pressure location, for performing user authentication.

In some embodiments, the pressure sensitive display device may include fingerprint recognition functionality which may be used in conjunction with the detected pressures of user touches and locations of user touches. For example, an authentication pattern may include a fingerprint of the user, as well as a set of user pressure values and location values for the set of user touches.

The image forming apparatus security system 106 may function to facilitate and/or implement security features for one or more devices and/or systems (e.g., the image forming apparatus 102 and/or pressure sensitive display device 104). In some embodiments, functionality of the image forming apparatus security system 106 may be integrated into the image forming apparatus 102 and/or the pressure sensitive display device 104. In some embodiments, the functionality of the image forming apparatus security system 106 may be performed by one or more other computing devices.

In some embodiments, the image forming apparatus security system 106 may function to provide and/or facilitate secure printing. For example, the image forming apparatus security system 106 may function to identify and/or detect authentication patterns (e.g., authentication patterns inputted through the pressure sensitive display device 104 by a user). The image forming apparatus security system 106 may compare an inputted authentication pattern against a registered authentication pattern associated with the user. If the inputted authentication pattern matches, or substantially matches, the registered authentication pattern associated with the user, then the image forming apparatus security system 106 may allow the user to access the printing system (e.g., to print a document). If the inputted authentication pattern does not match, or does not substantially match, the registered authentication pattern associated with the user, then the image forming apparatus security system 106 may prevent the user from accessing the printing system and/or may initiate other security actions. For example, the image forming apparatus security system 106 may modify portions of a document (e.g., a document the user has requested to print), and then instruct the image forming apparatus 102 to print the modified electronic document instead of the requested document.

In some embodiments, if the inputted authentication pattern does not match the registered authentication pattern, and/or match after a predetermined number of attempts, the image forming apparatus security system 106 may launch an alternate operating system for the image forming apparatus 102 and/or pressure sensitive display device 104 that may be presented to the user. The alternate operating system may present and/or allow access to alternative data in a manner that appears as if it were the original data. This may, for example, cause the user to believe that the system has been successfully accessed. In some embodiments, the alternate operating system may replace and/or modify confidential portion(s) of document(s) (e.g., confidential images) in real-time with different, albeit similar, information (e.g., different images) that does not convey the correct information of the original data. In some embodiments, the alternate images may show as redacted or may include an image indicating that the original image being replaced was confidential.

The communication link 108 may function to provide communication between the image forming apparatus 102 and the image forming apparatus security system 104, and/or other systems described herein. The communication link 108 may represent one or more computer networks (e.g., LAN, WAN, or the like) or other transmission mediums. In some embodiments, the communication link 108 includes one or more computing devices, routers, cables, buses, and/or other network topologies (e.g., mesh, and the like). In some embodiments, the communication link 108 may be wired and/or wireless. In various embodiments, the communication link 108 may include the Internet, one or more wide area networks (WANs) or local area networks (LANs), one or more networks that may be public, private, IP-based, non-IP based, and so forth. As used herein, a communication network may refer to one or more communication links.

The communication link 110 may function to provide communication between the pressure sensitive display device 106, image forming apparatus 102, and/or the image forming apparatus security system 104, and/or other systems described herein. The communication link 110 may be same as, or comprise a portion of, the communication link 108, and/or the communication link 110 may be distinct from the communication link 108. The communication link 110 may represent one or more computer networks (e.g., LAN, WAN, or the like) or other transmission mediums. In some embodiments, the communication link 108 includes one or more computing devices, routers, cables, buses, and/or other network topologies (e.g., mesh, and the like). In some embodiments, the communication link 110 may be wired and/or wireless. In various embodiments, the communication link 110 may include the Internet, one or more wide area networks (WANs) or local area networks (LANs), one or more networks that may be public, private, IP-based, non-IP based, and so forth.

Figure 2:
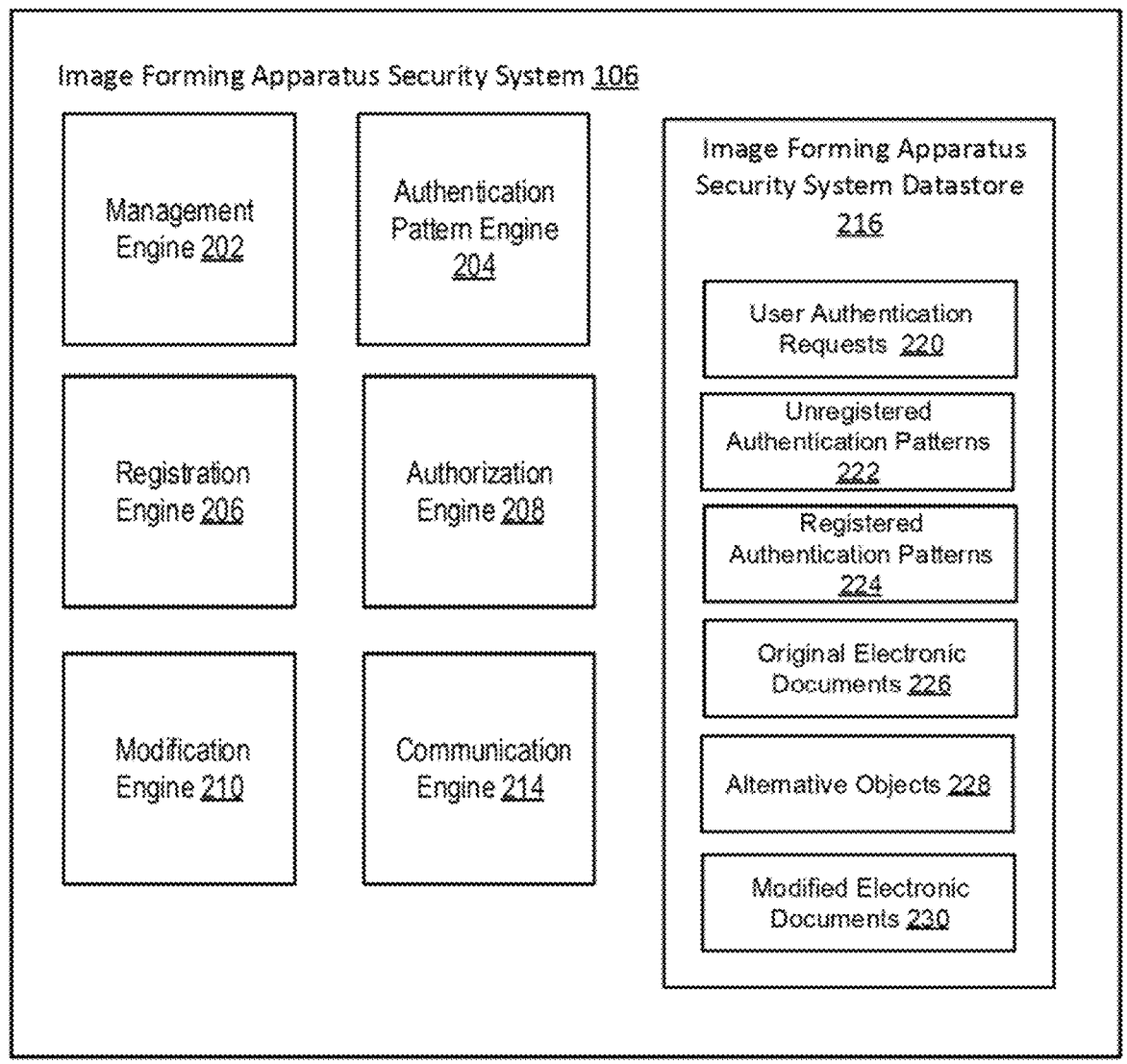
FIG. 2 depicts a diagram of an example image forming apparatus security system according to some embodiments.

FIG. 2 depicts a diagram of an example of an image forming apparatus security system 106 according to some embodiments. In the example of FIG. 2, the image forming apparatus security system 106 includes a management engine 202, an authentication pattern engine 204, a registration engine 206, an authorization engine 208, a modification engine 210, a communication engine 214, and an image forming apparatus security system datastore 216.

The management engine 202 includes hardware, software and/or firmware configured to function to manage (e.g., create, read, update, delete, or otherwise access) user authentication requests 220, unregistered authentication patterns 222, registered authentication patterns 224, original electronic documents 226, alternative objects 228, and/or modified electronic documents 230. Any of 220-230 may be stored in the image forming apparatus security system datastore 216 and/or other datastore(s) associated with the image forming apparatus security system 106. The management engine 202 may perform any of these operations manually (e.g., by a user interacting with a GUI) and/or automatically (e.g., triggered by one or more of the engines 204-216). Like other engines described herein, some or all of the functionality of the management engine 202 may be included in and/or cooperate with one or more other engines (e.g., engines 204-214).

The authentication pattern engine 204 includes hardware, software and/or firmware configured to function to detect unregistered authentication patterns 222 and/or registered authentication patterns 224. An unregistered authentication pattern 222 is an authentication pattern that has not been registered. Accordingly, an unregistered authentication pattern 222 may be referred to simply as an authentication pattern 222. In some embodiments, an authentication pattern 222 may be included as part of a user authentication request 220, and/or may be detected as a user is inputting the authentication pattern 222 (e.g., using a pressure sensitive display device 104). For example, a user authentication request 220 may be associated with, and/or include, a request to print an original electronic document 226. An original electronic document 226 may comprise an electronic document that has not been modified by the image forming apparatus security system 106. Original documents 226 may be stored individually and/or as sets of original electronic documents 226. An electronic document may include images (e.g., pictures, video), audio, text, and/or the like.

In some embodiments, the original electronic documents 226 are stored with authentication information of one or more users that are allowed to access the original electronic document 226 and/or set of original electronic documents 226. In some embodiments, the original electronic documents 226 may be generated by a computing device (e.g., a work computer) and provided to one or more of the systems described herein for temporary and/or permanent storage.

In some embodiments, the authentication pattern engine 204 may detect a group (or, set) of taps (e.g., a particular type of user touch) as an authentication pattern 222. For example, the authentication pattern engine 204 may detect taps on an operation panel as the authentication pattern 222. In some embodiments, the authorization engine 204 may detect a first user pressure (e.g., 4 PSI) on a first authentication area of an authentication interface of an operation panel, and detect a second user pressure (e.g., 8 PSI) on a second authentication area of the authentication interface of the operation panel. Although two user pressures are described, an authentication pattern 222 may include a greater or lesser number of user pressures.

Although user taps are described herein, it will be appreciated that other types of user touches may be included. For example, a user touch may include a swipe and/or other gesture. Pressures, in some embodiments, may be a single value, multiple values, and/or a value range for each user touch. For example, if the user touch is a swipe instead of tap, the pressure may be multiple values along the path of the swipe (e.g., starting with a relatively light pressure, and increasing in pressure through the swipe).

In some embodiments, the authentication pattern engine 204 may detect a time series of user touches. For example, the authentication pattern engine 204 may determine a first authentication area is touched with a first pressure during a first time window, and determine a second authentication area is touched with a second pressure during a second time window. The authentication pattern 222 may comprise the time series of user touches. For example, the time series may include a first touch of 0.5 seconds, a second touch of 1 second, and/or the like. As used herein, a user touch may refer to a type of user touch (e.g., tap, swipe, gesture), location of a user touch, a pressure of a user touch, a fingerprint of a user touch, and/or a time window of a user touch.

The registration engine 206 includes hardware, software and/or firmware configured to function to register users and/or register authentication patterns 222 to generate registered authentication patterns 224. In some embodiments, users may input account credentials (e.g., user identifier, authentication pattern 222, password), personal information (e.g., name, contact information), and/or the like. For example, the user may input an unregistered authentication pattern 222 through an operation panel, and the registration engine 206 may generate the registered authentication pattern 224 from the unregistered authentication pattern 222. The registration engine 206 may store the registered authentication pattern 224 as part of the user's account credentials. In some embodiments, the registration engine 206 may prompt a user to input an authentication pattern 222 as part of user registration. The registration engine 206 may store and/or register the authentication pattern 222 as a time series of the set of taps of the authentication pattern 222.

The authorization engine 208 includes hardware, software and/or firmware configured to function to determine whether a user authentication request 220 is authorized or not authorized. In some embodiments, the authorization engine 208 retrieves a registered authentication pattern 224 associated with the user. The registered authentication pattern 224 may include one or more registered user pressures (e.g., 4.3 PSI and 7.9 PSI) of one or more corresponding user touches in one or more authentication areas of an authentication interface. The authorization engine 208 may compare an authentication pattern 222 with a registered authentication pattern 224 to determine whether a user authentication request 220 is authorized. The comparison may include comparing a first user pressure of a first user touch of the authentication pattern 222 and a second user pressure of a second user touch of the authentication pattern 222 against one or more registered user pressures of the user's registered authentication pattern 224. If the authorization engine 208 authorizes the user authentication request 220, the authorization engine 208 may allow the user authentication request 220 to be further processed (e.g., allow an associated original document 226 to be printed). Alternatively, if the authorization engine 208 does not authorize the user authentication request 220, the authorization engine 208 may trigger one or more security actions, such as preventing the original electronic document 226 from being printed for a period of time, notifying an author of the original electronic document 226, and/or the like.

In some embodiments, if the authorization engine 208 authorizes the user authentication request 220, the authorization engine 208 retrieves, and/or instructs one or more other systems (e.g., image forming apparatus 102) to retrieve, an original electronic document 226 associated with the user and/or user authentication request 220. For example, the user authentication request 220 may be associated and/or include a request to print the original electronic document 226.

In some embodiments, the authorization engine 208 functions to determine a confidence level (or, score) of an inputted authentication pattern 222 based on the detected user pressures, and/or other values associated with user touch (e.g., location, fingerprint, time series). The authorization engine 208 may further compare the determined confidence level to one or more confidence level threshold values and/or conditions. Authorization of the user authentication request may be based on the comparison. In some embodiments, the authorization engine 208 may determine the confidence level based on how closely the inputted authentication pattern 222 matches the corresponding registered authentication pattern 224. For example, if the registered authentication pattern 224 indicates 4.7 PSI for a first user touch and 8 PSI for a second user touch, and the inputted authentication pattern 222 indicates 4.6 PSI for the first user touch and 8.1 PSI for the second user touch, the confidence level may be relatively high. Alternatively, if the registered authentication pattern 224 indicates 4.7 PSI for a first user touch and 8 PSI for a second user touch, and the inputted authentication pattern 222 indicates 2.2 PSI for the first user touch and 12 PSI for the second user touch, the confidence level may be relatively low.

In some embodiments, the authorization engine 208 may define a first confidence level threshold value that is higher than a second confidence level threshold value. If the determined confidence level is equal to or higher than the first confidence level threshold value, the authorization engine 208 may allow, and/or cause, an associated original electronic document 226 to be printed. If the determined confidence level is equal to or higher than the second confidence level threshold value and lower than the first confidence level threshold value, the authorization engine 208 may allow, and/or cause, the user to be prompted to input an authentication pattern. If the determined confidence level is lower than the second confidence level threshold value, the authorization engine 208 may allow, and/or cause, an associated modified electronic document 230 (as discussed elsewhere herein), e.g., without the confidential objects therein, to be printed.

In some embodiments, the authorization engine 208 compares time series values of authentication patterns 224 to registered authentication patterns 224 to determine whether an associated user authentication request 220 is authorized. For example, the registered authentication pattern 224 may require that a set of touches be entered during one or more time periods (e.g., e.g., between 2-4 PM), and/or may require that one or more the set of touches be held and/or input within particular range(s) of time. For example, the registered authentication pattern 224 may indicate that a first user touch is held between 0.5 seconds and 1 second, a second touch is held between 0.25 seconds and 0.75 seconds, and/or the like.

In some embodiments, the authorization engine 208 functions to display a list of original electronic documents 226 associated with a user that initiated an authorized user authentication request 220. For example, the authorization engine 208 may look up the original electronic documents 226 based on account information associated with the original electronic documents 226. The authorization engine 208 may receive a selection of one or more of the original documents 226. For example, the user may interact with an operation panel to make a selection, and the operation panel may provide the selection to the authorization engine 208. The authorization engine 208 may allow the original electronic documents 226 associated with the user to be printed, and/or prevent the user from printing original electronic documents 226 that are not associated with the user.

In some embodiments, the authorization engine 208 functions to generate one or more notifications associated with failed authorizations of user authentication requests 220. For example, the authorization engine 208 may notify a user (e.g., an author of an original electronic document 226) and/or other systems of the failed authorization. Notifications may also include instructions to lock and/or otherwise prevent access to original electronic documents 226. For example, original electronic documents 226 may be locked for a predetermined amount of time (e.g., 2 days) after a failed authorization of a user authentication request 220. Notifications may be resent (e.g., to the same or different user), and/or reminders of the notifications may be sent, if the notifications are not received by their intended recipient.

In some embodiments, the authorization engine 208 may allow a user to input another authentication pattern 222 in response to a failed authorization of a user authentication request 220. This may allow the system to be more accurate by not locking original electronic documents 226 or taking other actions if a user merely made an error inputting an authentication pattern 222. For example, the authorization engine 208 may define a threshold number of attempted authentication pattern 222 inputs (e.g., 3 attempts). Once the threshold is reached and/or exceeded, then the authorization engine 208 may flag the associated user authentication request 220 as a failed authorization, and one or more actions may be taken, as described elsewhere herein.

In some embodiments, the authorization engine 208 may present false information in response to a failed authorization of a user authentication request 220. For example, the authorization engine 208 may cause an operation panel to display "toner empty and cannot print right now" in order to dissuade the user from printing and/or not inform the user that the inputted authentication pattern 222 was not authorized.

The modification engine 210 includes hardware, software and/or firmware configured to function to determine whether an original electronic document 226 includes a confidential object. A confidential object may be a confidential image (picture, video), confidential text (e.g., alphabetic, number, alphanumeric), confidential audio, and/or other confidential information within an original electronic document 226. In some embodiments, the modification engine 210 may determine whether the original electronic document 226 includes a confidential object in response to a failed authorization associated with the original electronic document 226 (e.g., a request to print the original electronic document 226). If the original electronic document 226 includes a confidential object, the modification engine 210 may obtain (e.g., retrieve and/or generate) an alternative object 228 associated with the confidential object. Alternative objects 228 may be predetermined and/or obtained in real-time (e.g., at substantially the same time as the associated user authentication request 220 failed authorization). In some embodiments, the modification engine 210 may generate a modified electronic document 230 based on the original electronic document 226 and the alternative object 228. For example, the modification engine 210 may replace the confidential object with the alternative object 228.

In some embodiments, the modification engine 210 obtains alternative objects 228 by determining if the recognized confidential object comprises alphabetic characters. If the recognized confidential object is determined to comprise alphabetic characters, the modification engine 210 may determine a different set of alphabetic characters from the alphabetic characters of the recognized confidential object. For example, the different set of alphabetic characters may have an opposite meaning as the alphabetic characters of the alternative object.

In some embodiments, the modification engine 210 obtains alternative objects 228 by determining if the recognized confidential object includes an image object. If the recognized confidential object is determined to be an image object, the modification engine 210 may generate and/or otherwise obtain a different image object as the alternative object. The different image object may be generated from the recognized confidential object. For example, the different image object may have a different resolution, different colors, different shapes, and/or other different content and/or format. In some embodiments, a warping algorithm may be applied to the recognized confidential object to generate the alternative object 228.

In some embodiments, the modification engine 210 obtains alternative objects 228 by determining if the recognized confidential object includes numeric characters. If the recognized confidential object includes numeric characters, the modification engine 210 may create different numeric characters from the recognized numeric characters as the alternative object. For example, the modification engine 210 may apply a multiplier or other modifier to the recognized confidential object to generate the different numeric characters of the alternative object 228.

In some embodiments, the image forming apparatus security system 106 may store electronic documents with the confidential objects replaced with alternative objects 228 prior to determining whether a user authentication request 220 is authorized. Accordingly, if a user authentication request 220 is authorized, the modification engine 210 may replace the alternative objects 228 with the confidential objects, and if a user authentication request 220 is not authorized, the electronic document may be printed with the alternative objects 228 without further modification.

As used herein, determining whether a user authentication request is authorized may include determining whether one or more users associated with the user authentication request 220 (e.g., the user that initiated the user authentication request 220) is authorized.

The communication engine 214 includes hardware, software and/or firmware configured to function to send requests, transmit and, receive communications, and/or otherwise provide communication with one or a plurality of the systems, devices, engines, and/or datastores described herein. In some embodiments, the communication engine 214 functions to encrypt and decrypt communications. The communication engine 214 may function to send requests to and receive data from one or more systems through a network or a portion of a network. Depending upon implementation-specific considerations, the communication engine 214 may send requests and receive data through a connection, all or a portion of which may be a wireless connection. The communication engine 214 may request and receive messages, and/or other communications from associated systems and/or engines. Communications may be stored in the image forming apparatus security system datastore 216.

Figure 3:
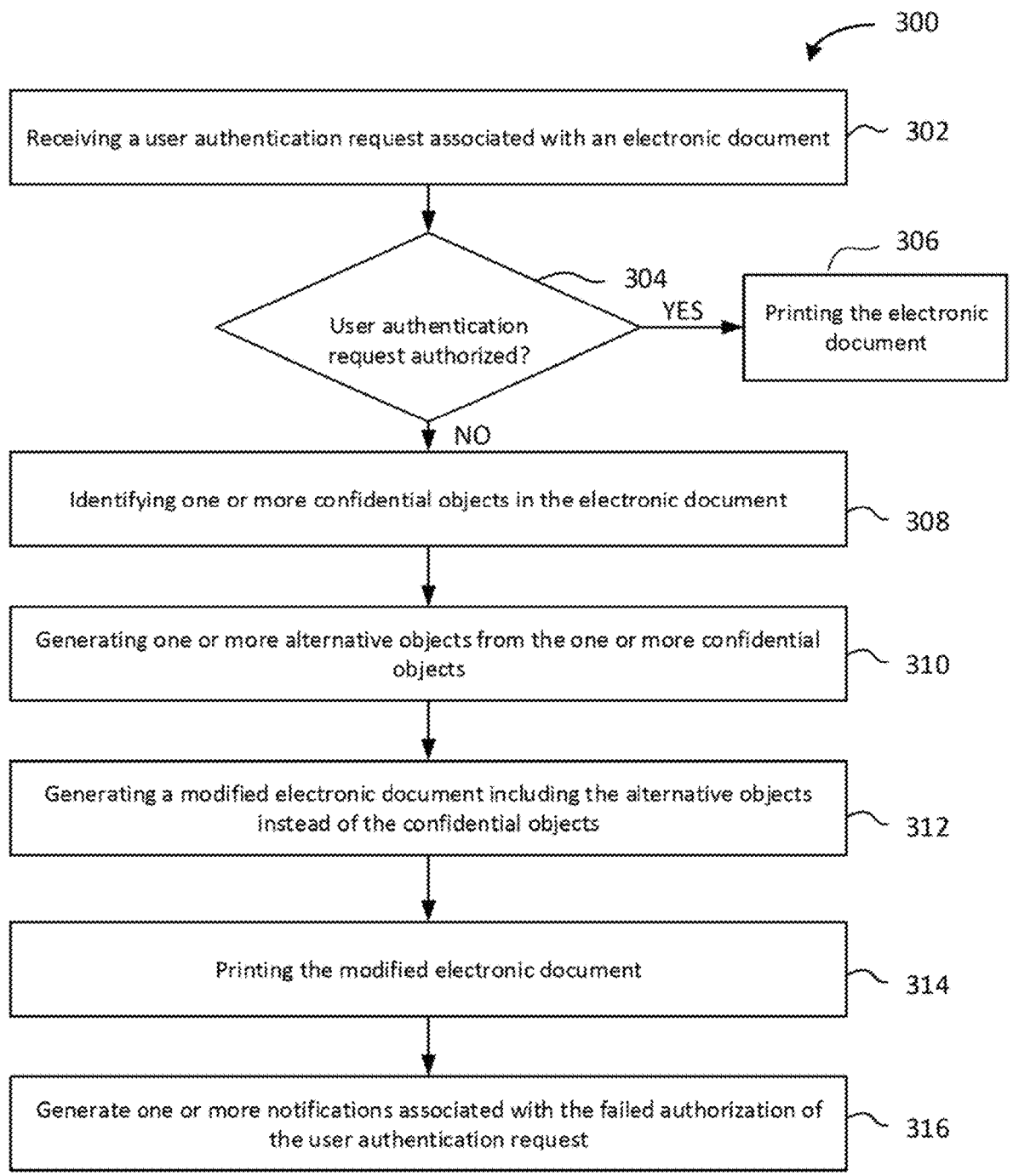
FIG. 3 depicts a flowchart of an example method of secure printing according to some embodiments.

FIG. 3 depicts a flowchart of an example of a method 300 of secure printing according to some embodiments. In this and other flowcharts, the flowchart illustrates by way of example a sequence of steps. It should be understood the steps may be reorganized for parallel execution, or reordered, as applicable. Moreover, for the sake of clarity, some steps that could have been included may have been excluded and some steps that could have been excluded may have been included.

In step 302, an image forming apparatus security system (e.g., image forming apparatus security system 106) receives a user authentication request (e.g., user authentication request 220) associated with printing an electronic document (e.g., an original electronic document 226). In some embodiments, a communication engine (e.g., communication engine 214) receives the user authentication request over one or more communication links (e.g., communication link(s) 108 and/or 110) from a pressure sensitive display device (e.g., pressure sensitive display device 104).

In step 304, the image forming apparatus security system determines whether the user authentication request is authorized or not authorized. For example, the user authentication request may include an authentication pattern (e.g., authentication pattern 222), and an authorization engine (e.g., authorization engine 208) may compare the authentication pattern to a registered authentication pattern (e.g., registered authentication pattern 224) to determine whether the user authentication request is authorized.

If the user authentication request is authorized, the image forming apparatus security system may cause an image forming apparatus (e.g., image forming apparatus 102) to print the electronic document (step 306). Alternatively, if the user authentication request is not authorized, the image forming apparatus security system may identify one or more confidential objects in the electronic document (step 308). The image forming apparatus security system may also prevent the image forming apparatus from printing the electronic document permanently and/or temporarily (e.g., for a predetermined amount of time).

In step 310, the image forming apparatus security system generates one or more alternative objects (e.g., alternative objects 228) from the one or more confidential objects. For example, the image forming apparatus security system may generate a duplicate of the one or more confidential objects and modify the duplicate confidential objects. In some embodiments, a modification engine (e.g., modification engine 210) performs the modification to generate the one or more alternative objects.

In step 312, the image forming apparatus security system generates a modified electronic document (e.g., a modified electronic document 230) including the alternative objects instead of the confidential objects. For example, the image forming apparatus security system may replace the confidential objects with the alternative objects to generate the second electronic document. In some embodiments, the modification engine generates the modified electronic document.

In step 314, the image forming apparatus security system causes the image forming apparatus to print the modified electronic document. In some embodiments, the communication engine may provide the modified electronic document to the image forming apparatus over one or more communication links.

In step 316, the image forming apparatus security system generates one or more notifications associated with the failed authorization of the user authentication request. For example, the image forming apparatus security system may notify one or more other users (e.g., an author of the original electronic document). In some embodiments, the authorization engine may generate the one or more notifications.

Figure 4:
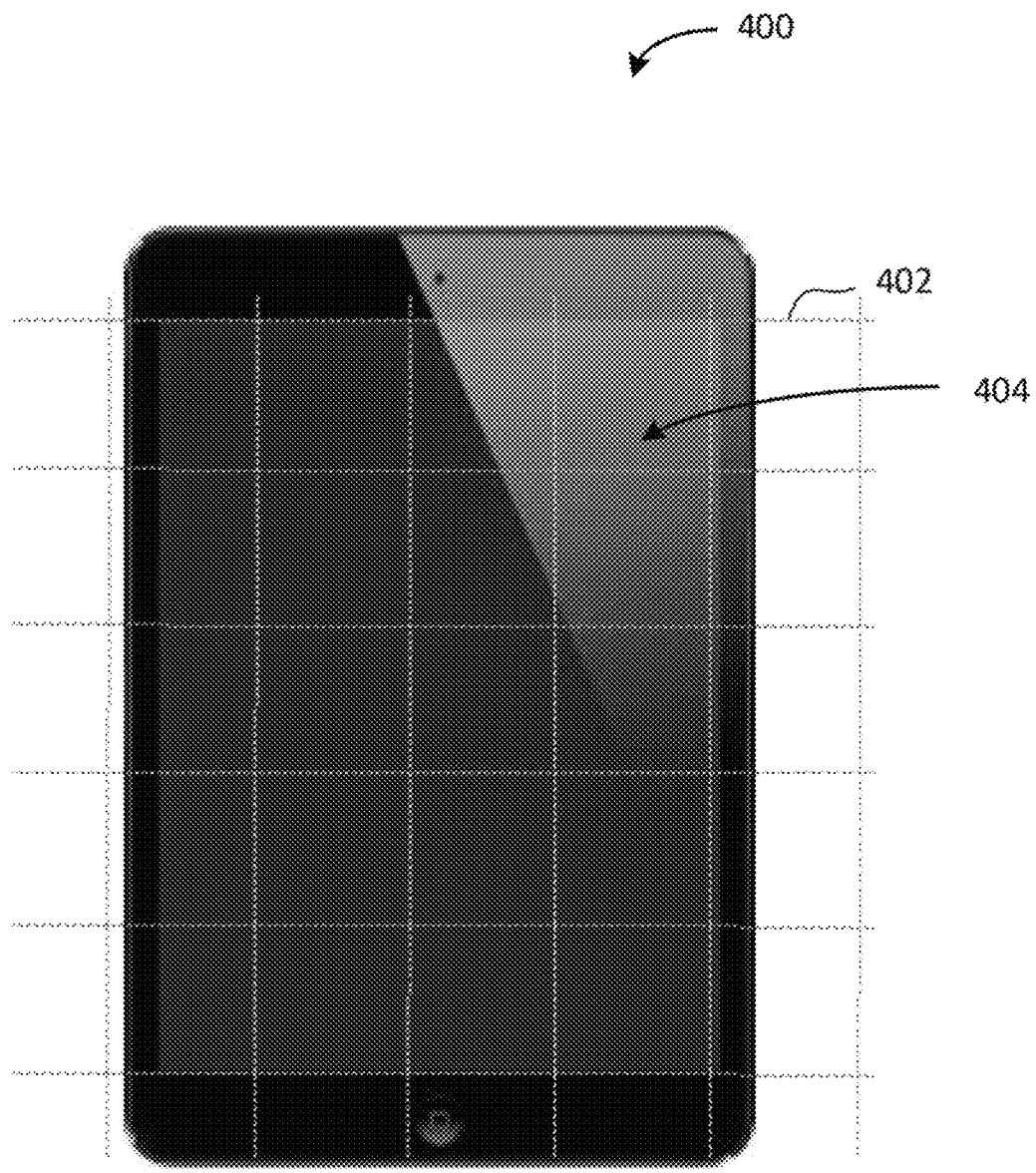
FIG. 4 depicts a diagram of an example pressure sensitive display device according to some embodiments.

FIG. 4 depicts a diagram of an example of a pressure sensitive display device 104 according to some embodiments. In the example of FIG. 4, the pressure sensitive display device 104 presents an authentication interface including one or more pressure points on a screen which may be used with or without a fingerprint recognition device to allow access to an associated device (e.g., image forming apparatus 102). That is, in some embodiments, a combination of pressure points and an amount of pressure on each point could be used to allow access to the associated device. During registration, the authentication interface presents equidistant lines 402 that grid the interface into equal length squares 404. The distance between the lines 402 may be determined by security requirements. When the user's fingers are put on the authentication interface, the location of each finger within each of the squares 404, as well as the measured pressure at each location is stored as the user's registered authentication pattern.

During authentication, the authentication interface is presented without the lines, and the user has to approximate the location and pressure of his fingers that were used during registration of their authentication pattern. To increase security, additional security features may be used, such as time series, as discussed elsewhere herein.

Figure 5A:
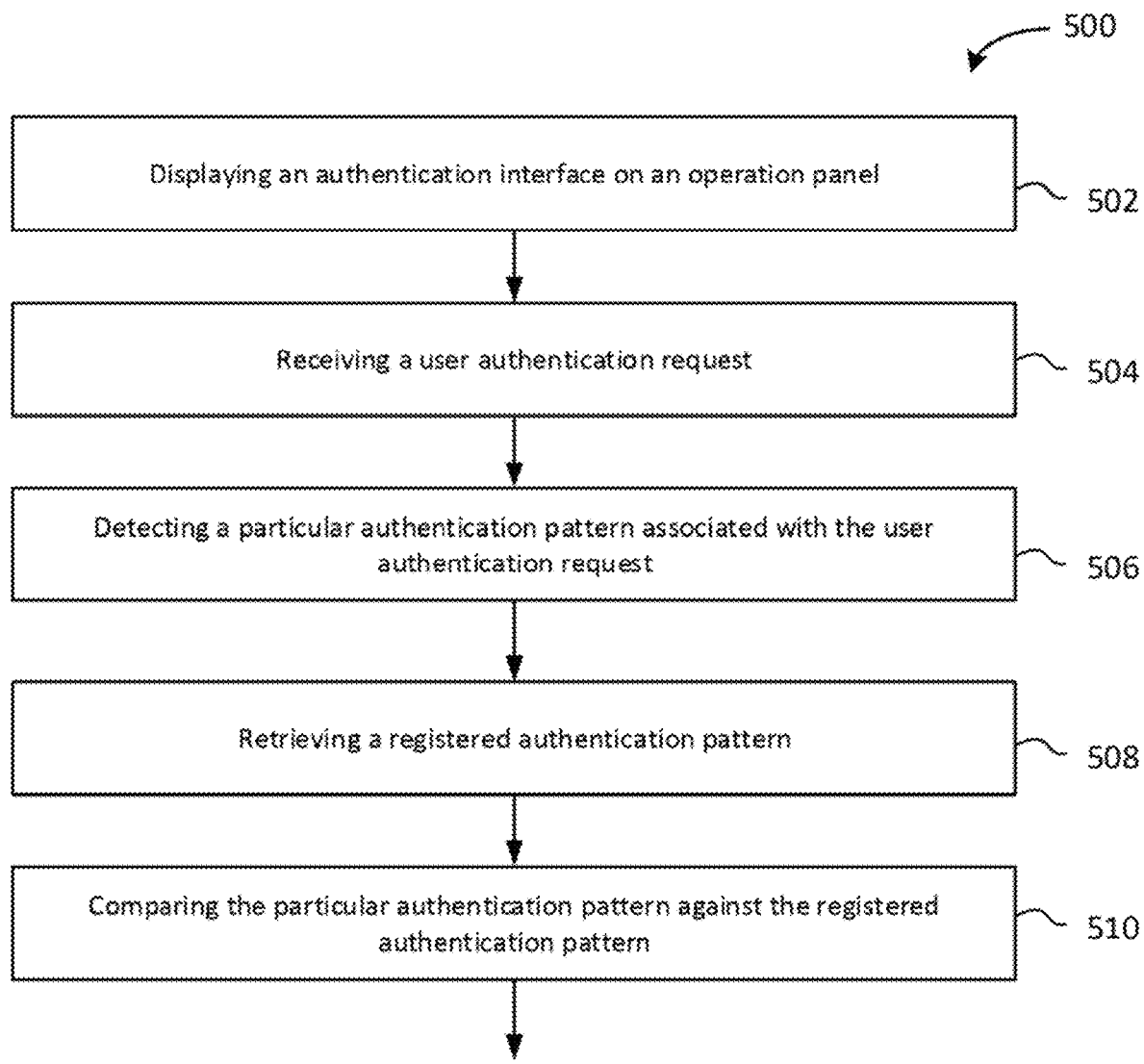
FIGS. 5A-B depict a flowchart of an example method of secure printing according to some embodiments.
Figure 5B:
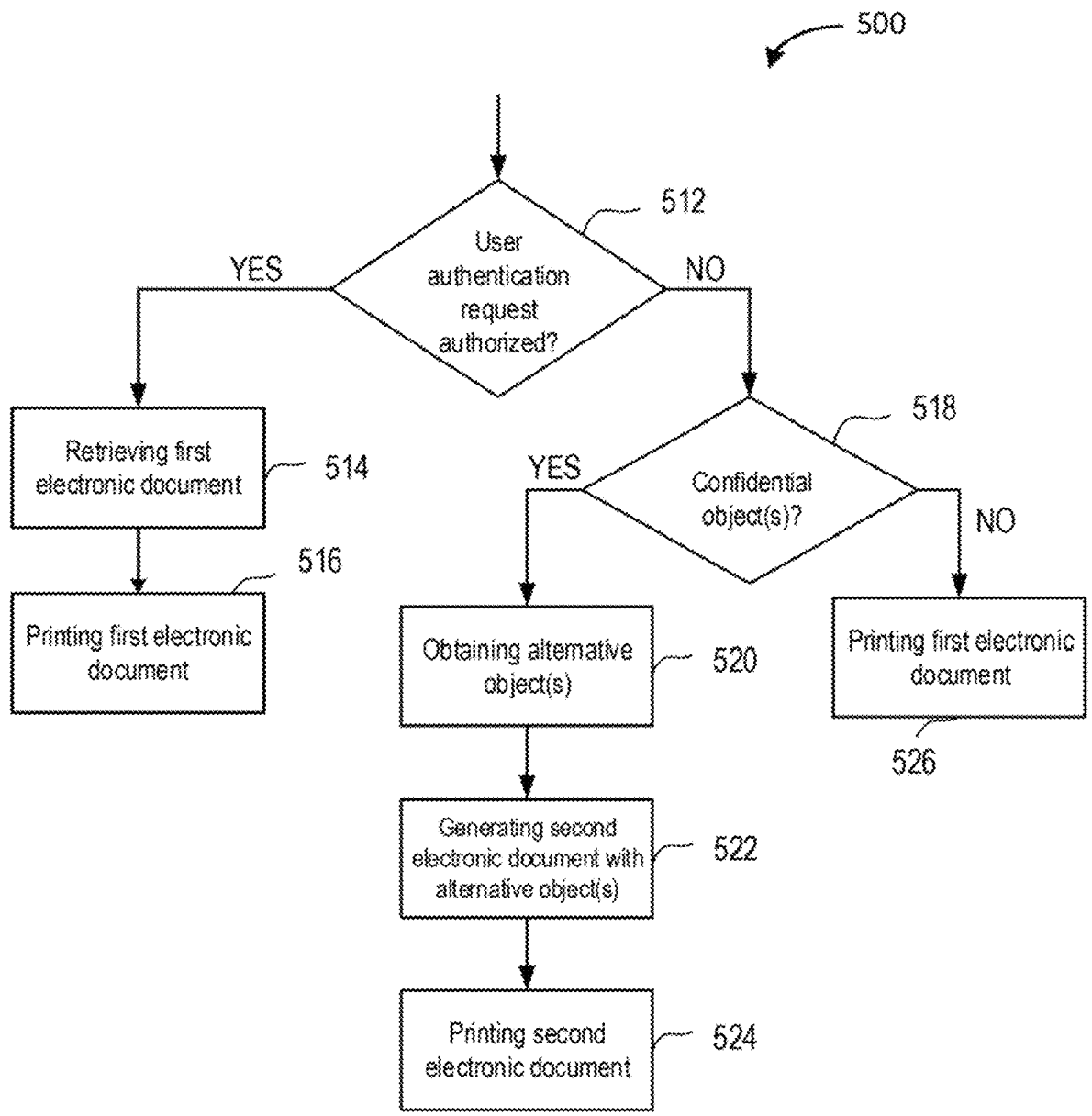

FIGS. 5A-B depict a flowchart of an example of a method 500 of secure printing according to some embodiments.

In step 502, a pressure sensitive display device (e.g., pressure sensitive display device 104) displays an authentication interface on an operation panel (e.g., pressure sensitive display device 104) associated with a printing device (e.g., image forming apparatus 102). The operation panel may include a plurality of authentication areas (e.g., authentication areas 404). The authentication interface may be capable of prompting a user to input an authentication pattern (e.g., an unregistered authentication pattern 222). The operation panel may be integrated with the image forming apparatus and/or it may be separate. One or more communication links (e.g., communication links 108 and/or 110) may be used to provide communication between the operation panel and the image forming apparatus.

In step 504, an image forming apparatus security system (e.g., image forming apparatus security system 106) receives a user authentication request (e.g., user authentication request 220) using the authentication interface. The user authentication request may be associated with the user. For example, the user may use the authentication interface to initiate an authentication request, and the operation panel may generate and/or provide the authentication request to the image forming apparatus security system (e.g., via communication link(s) 108 and/or 110). In some embodiments, a communication engine (e.g., communication engine 214) receives the user authentication request.

In step 506, the image forming apparatus security system detects a particular authentication pattern (e.g., an unregistered authentication pattern 222) associated with the user authentication request. The particular authentication pattern may be included in the user authentication request and/or be detected as the user is inputting the particular authentication pattern using the authentication interface of the operation panel. The particular authentication pattern may be detected by detecting a group of taps on the operation panel. Detecting the group of taps on the operation panel may include detecting a first user pressure (e.g., 4 PSI) on a first authentication area (e.g. an authentication area 404) of the plurality of authentication areas and a second user pressure (e.g., 8 PSI) on a second authentication area (e.g., a different authentication area 404) of the plurality of authentication areas. In some embodiments, an authentication pattern engine (e.g., authentication pattern engine 204) detects the particular authentication pattern.

In step 508, the image forming apparatus security system retrieves a registered authentication pattern (e.g., registered authentication pattern 224) associated with the user. The registered authentication pattern may include one or more registered user pressures (e.g., 4.3 PSI and 7.9 PSI) in one or more authentication areas of the plurality of authentication areas. In some embodiments, an authorization engine (e.g., authorization engine 208) retrieves the registered authentication pattern.

In step 510, the image forming apparatus security system compares the particular authentication pattern with the registered authentication pattern. The comparison may include comparing the first user pressure and the second user pressure against the one or more registered user pressures (e.g., of the registered authentication pattern). In some embodiments, the authorization engine performs the comparison.

In step 512, the image forming apparatus security system determines, based on the comparison, whether the user authentication request is authorized. In some embodiments, the authorization engine performs the determination. If the user authentication request is authorized, the image forming apparatus security system retrieves, and/or instructs the image forming apparatus to retrieve, a first electronic document (e.g., an original electronic document 226) associated with the user and/or user authentication request (step 514). The image forming apparatus may print the first electronic document (step 516). For example, the communication engine may provide the first electronic document and/or the instruction to the image forming apparatus via the one or more communication links.

Alternatively, if the user authentication request is not authorized, the image forming apparatus security system determines whether the first electronic document includes a confidential object (step 518). The image forming apparatus security system may obtain, if the first electronic document includes a confidential object, an alternative object (e.g., alternative object 228) associated with the confidential object (step 520). The image forming apparatus security system may generate a second electronic document (e.g., a modified electronic document 230) by replacing the confidential object with the alternative object on the first electronic document (step 522). The image forming apparatus may print the second electronic document step 524). For example, the image forming apparatus security system may provide the second electronic document to the image forming apparatus over the communication link(s). In step 526, if the first electronic document does not include a confidential object, the image forming apparatus may print the first electronic document.

In some embodiments, there may be one or more states in addition "authorized" and "not authorized." For example, the image forming apparatus security system 106 may determine a confidence level for the authentication pattern, and that confidence level may not satisfy a first threshold condition associated with "authorized" or a second threshold condition associated with "not authorized," but may be somewhere in between. If in between the threshold conditions, the image forming apparatus security system may prompt the user to re-input the authentication pattern, and/or perform one or more other actions. For example, the image forming apparatus security system may prompt the user to provide additional credentials (e.g., a password) that may be matched with the user's account information. The re-inputted authentication pattern and/or additional credentials may be evaluated to re-calculate the confidence level and determine whether it satisfies "authorized" or "not authorized."

It will be appreciated that although authentication is described herein with reference to pressure-sensitive inputs (e.g., authentication patterns 222), other embodiments may include other types authentication inputs (e.g., an alphanumeric password) instead of, or in addition to, pressure-sensitive inputs. Accordingly, in some embodiments, if a user enters an incorrect alphanumeric password, the image forming apparatus security system 106 may trigger modification of an original electronic document 226, or other action, as described elsewhere herein.

It will be appreciated that although the security features described herein are discussed with reference to providing secure printing, other embodiments may include providing security features (e.g., authentication patterns 222, generated modified electronic documents 230 from original electronic documents 226, and/or the like) with respect to other types of systems. For example, the authentication interface may be associated with a home security system, and a user may disarm the home security system using an authentication pattern 222.

Hardware Implementation

The techniques described herein can be implemented using one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows 10, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
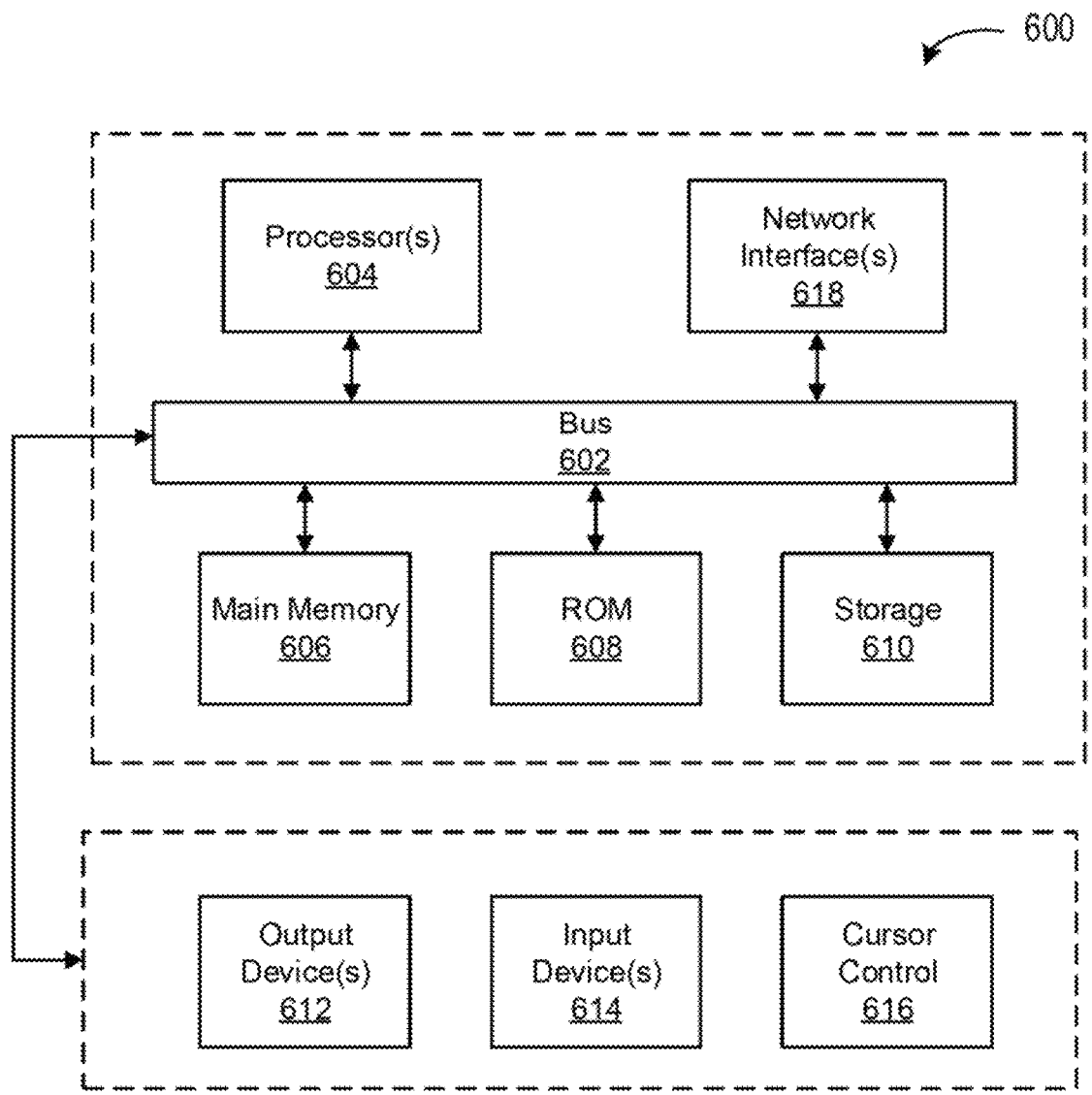
FIG. 6 is a diagram of an example computer system for implementing the features disclosed herein according to some embodiments.

FIG. 6 illustrates a block diagram that illustrates a computer system 600 upon which computer-based processing involved in embodiments described herein may be implemented. In some embodiments, the computer system 600 can be employed as the image forming apparatus 102, the pressure sensitive display device 104, and/or the image forming apparatus security system 106. In some embodiments, the computer system 600 can be employed as one or more engines described herein. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

The computer system 600 also includes a network interface 618 coupled to bus 602. Network interface 618 provides a two-way data communication coupling to one or more network links that are connected to one or more local networks. For example, network interface 618 may be an integrated services digital network (ISDN) card, cable modem, satellite modem, or a modem to provide a data communication connection to a corresponding type of telephone line. As another example, network interface 618 may be a local area network (LAN) card to provide a data communication connection to a compatible LAN (or WAN component to communicate with a WAN). Wireless links may also be implemented. In any such implementation, network interface 618 sends and receives electrical, electromagnetic or optical signals that carry digital data streams representing various types of information.

A network link typically provides data communication through one or more networks to other data devices. For example, a network link may provide a connection through a local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and network interface 618. In the Internet example, a server might transmit a requested code for an application program through the Internet, the ISP, the local network and the network interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational NoSQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A method of printing at a printing device, comprising:
   displaying an authentication interface on an operation panel associated with a printing device, the operation panel including a plurality of authentication areas, the authentication interface being capable of prompting a user to input an authentication pattern;
   receiving a user authentication request using the authentication interface, the user authentication request being associated with the user;
   detecting a particular authentication pattern associated with the user authentication request, the detecting the particular authentication pattern including detecting a group of taps on the operation panel, the detecting the group of taps on the operation panel including detecting a first user pressure on a first authentication area of the plurality of authentication areas and a second user pressure on a second authentication area of the plurality of authentication areas;

retrieving a registered authentication pattern associated with the user, the registered authentication pattern including one or more registered user pressures in one or more authentication areas of the plurality of authentication areas;

comparing the particular authentication pattern with the registered authentication pattern, the comparing including comparing the first user pressure and the second user pressure against the one or more registered user pressures;

determining, based on the comparing, whether the user authentication request is authorized;

if the user authentication request is authorized:
retrieving a first electronic document associated with the user; and
printing the first electronic document; and if the user authentication request is not authorized:
determining whether the first electronic document includes a confidential object;
obtaining, in response to determining the first electronic document includes the confidential object, an alternative object associated with the confidential object; and
generating a second electronic document by replacing the confidential object with the alternative object on the first electronic document, and printing the second electronic document.

2. The method of claim 1, further comprising:
displaying the plurality of authentication areas on the operation panel;
prompting the user to tap at least two of the plurality of authentication areas on the operation panel;
detecting a second group of taps, the detecting the second group of taps including detecting that the user taps the first authentication area with the first pressure and the second authentication area with the second pressure;
registering the second group of taps as the registered authentication pattern associated with the user;
wherein the detecting the second group of taps further comprises:
determining the first authentication area is touched with the first pressure during a first time window; and
determining the second authentication area is touched with the second pressure during a second time window; and
wherein the registering the second group of taps includes registering a time series of the second group of taps as the authentication pattern.

3. The method of claim 1, further comprising:
comparing the first user pressure and the second user pressure to one or more confidence level threshold values, wherein the determining whether the user authentication request is authorized is based on the comparing the first user pressure and the second user pressure to the one or more confidence level threshold values.

4. The method of claim 1, further comprising:
if the user authentication request is not authorized, preventing the first electronic document from being accessed and being printed within a predetermined amount of time.

5. The method of claim 1, further comprising:
storing the alternative objects to be associated with the first electronic document.

6. The method of claim 1, further comprising:
storing the second electronic document to be associated with the first electronic document.

7. The method of claim 1, further comprising:
generating, by a computing device, a first electronic document set including the first electronic document;
providing the first electronic document from a computing device to the printing device; and
storing the first electronic document comprises storing the first electronic document set associated with authentication information of one or more users who are allowed to access the first electronic document set.

8. The method of claim 7, further comprising:
displaying a list of documents including the first electronic document of the first electronic document set associated with the user who requests the authentication; and
receiving a selection of one or more documents to be printed.

9. The method of claim 1, wherein the obtaining the alternative object comprises:
determining if the recognized confidential object comprises alphabetic characters; and
if the recognized confidential object is determined to comprise alphabetic characters, determining a different set of alphabetic characters having an opposite meaning to the alphabetic characters of the recognized confidential object.

10. The method of claim 1, wherein the obtaining the alternative object comprises:
determining if the recognized confidential object is an image object; and
if the recognized confidential object is determined to be the image object, generating a different image object as the alternative object.

11. A computing system, comprising:
one or more hardware processors; and
memory storing instructions that, when executed by the one or more hardware processors, cause the computing system to perform:
displaying an authentication interface on an operation panel associated with a printing device, the operation panel including a plurality of authentication areas, the authentication interface being capable of prompting a user to input an authentication pattern;
receiving a user authentication request using the authentication interface, the user authentication request being associated with the user;
detecting a particular authentication pattern associated with the user authentication request, the detecting the particular authentication pattern including detecting a group of taps on the operation panel, the detecting the group of taps on the operation panel including detecting a first user pressure on a first authentication area of the plurality of authentication areas and a second user pressure on a second authentication area of the plurality of authentication areas;
retrieving a registered authentication pattern associated with the user, the registered authentication pattern including one or more registered user pressures in one or more authentication areas of the plurality of authentication areas;
comparing the particular authentication pattern with the registered authentication pattern, the comparing including comparing the first user pressure and the second user pressure against the one or more registered user pressures;

determining, based on the comparing, whether the user authentication request is authorized;

if the user authentication request is authorized:
retrieving a first electronic document associated with the user; and
printing the first electronic document; and if the user authentication request is not authorized:
determining whether the first electronic document includes a confidential object;
obtaining, in response to determining the first electronic document includes the confidential object, an alternative object associated with the confidential object; and
generating a second electronic document by replacing the confidential object with the alternative object on the first electronic document, and printing the second electronic document.

12. The system of claim 11, wherein the instruction further cause the system to perform:
displaying the plurality of authentication areas on the operation panel;
prompting the user to tap at least two of the plurality of authentication areas on the operation panel;
detecting a second group of taps, the detecting the second group of taps including detecting that the user taps the first authentication area with the first pressure and the second authentication area with the second pressure;
registering the second group of taps as the registered authentication pattern associated with the user;
wherein the detecting the second group of taps further comprises:
determining the first authentication area is touched with the first pressure during a first time window; and
determining the second authentication area is touched with the second pressure during a second time window; and
wherein the registering the second group of taps includes registering a time series of the second group of taps as the authentication pattern.

13. The system of claim 11, wherein the instruction further cause the system to perform:
comparing the first user pressure and the second user pressure to one or more confidence level threshold values, wherein the determining whether the user authentication request is authorized is based on the comparing the first user pressure and the second user pressure to the one or more confidence level threshold values.

14. The system of claim 11, wherein the instruction further cause the system to perform:
if the user authentication request is not authorized, preventing the first electronic document from being accessed and being printed within a predetermined amount of time.

15. The system of claim 11, wherein the instruction further cause the system to perform:
storing the alternative objects to be associated with the first electronic document.

16. The system of claim 11, wherein the instruction further cause the system to perform:
storing the second electronic document to be associated with the first electronic document.

17. The system of claim 11, wherein the instruction further cause the system to perform:
generating, by a computing device, a first electronic document set including the first electronic document;
providing the first electronic document from a computing device to the printing device; and
storing the first electronic document comprises storing the first electronic document set associated with authentication information of one or more users who are allowed to access the first electronic document set.

18. The system of claim 17, wherein the instruction further cause the system to perform:
displaying a list of documents including the first electronic document of the first electronic document set associated with the user who requests the authentication; and
receiving a selection of one or more documents to be printed.

19. The system of claim 11, wherein the obtaining the alternative object comprises:
determining if the recognized confidential object comprises alphabetic characters; and
if the recognized confidential object is determined to comprise alphabetic characters, determining a different set of alphabetic characters having an opposite meaning to the alphabetic characters of the recognized confidential object.

20. The system of claim 11, wherein the authentication pattern includes a fingerprint associated with the user, the fingerprint being detected based on the group of taps on the operation panel, and wherein the determining whether the user authentication request is authorized is based on the fingerprint of the authentication pattern.

* * * * *